(12) United States Patent
Huang et al.

(10) Patent No.: US 12,281,642 B2
(45) Date of Patent: Apr. 22, 2025

(54) BIDIRECTIONAL ENERGY STORAGE DEVICE, ROBOTIC JOINT AND ROBOT

(71) Applicant: UBTECH ROBOTICS CORP LTD, Shenzhen (CN)

(72) Inventors: Zhongkui Huang, Shenzhen (CN); Hongyu Ding, Shenzhen (CN); Yisen Hu, Shenzhen (CN); MaLin Wang, Shenzhen (CN); Youpeng Li, Shenzhen (CN)

(73) Assignee: UBTECH ROBOTICS CORP LTD, Shenzhen (CN)

( * ) Notice: Subject to any disclaimer, the term of this patent is extended or adjusted under 35 U.S.C. 154(b) by 0 days.

(21) Appl. No.: 18/588,046

(22) Filed: Feb. 27, 2024

(65) Prior Publication Data

US 2024/0200538 A1    Jun. 20, 2024

Related U.S. Application Data (63) Continuation of application No. PCT/CN2021/127151, filed on Oct. 28, 2021.

(30) Foreign Application Priority Data

Aug. 27, 2021    (CN) .................. 202110996910.X (51) Int. Cl.
   *F03G 1/10*    (2006.01)
   *B25J 9/10*    (2006.01)

(52) U.S. Cl.
   CPC . *F03G 1/10* (2013.01); *B25J 9/10* (2013.01)

(58) Field of Classification Search
   CPC .. F03G 1/10; B25J 9/10; B25J 17/0258; B25J 19/005; B25J 17/0266; B25J 18/06; B25J 19/002; B25J 19/0025; B25J 19/025
   See application file for complete search history.

(56) References Cited

U.S. PATENT DOCUMENTS

| | | | |
|---|---|---|---|
| 6,959,795 B2 * | 11/2005 | Kienholz | F16F 13/002 188/267 |
| 8,336,420 B2 * | 12/2012 | Carter | B25J 17/0275 901/27 |

(Continued)

FOREIGN PATENT DOCUMENTS

| | | | |
|---|---|---|---|
| CN | 103610524 B | 9/2015 | |
| CN | 112405600 A | 2/2021 | |
| WO | WO-2006033209 A1 * | 3/2006 | ......... B25J 19/0012 |

OTHER PUBLICATIONS

ISR for PCT/CN2021/127151.
Written opinion of ISA for PCT/CN2021/127151.

*Primary Examiner* — Zakaria Elahmadi (57) ABSTRACT

A bidirectional energy storage device for a joint includes: a sleeve comprising an open end and an opposite, closed end; an elastic member attached to the sleeve; a sliding member slidably arranged at the open end of the sleeve, wherein opposite ends of the elastic member are respectively in contact with the closed end of the sleeve and the sliding member; a first telescopic link comprising a first end pivotally connected to the sliding member and an opposite, second end; and a second telescopic link comprising a first end pivotally connected to the sliding member and a second end. The second ends of the first telescopic link and the second telescopic link are pivotally connected to a rotating member at an end of the joint, and the first telescopic link and the second telescopic link are to extend and retract to drive the sliding member to side along the sleeve.

20 Claims, 4 Drawing Sheets

(56) References Cited

U.S. PATENT DOCUMENTS

| | | | |
|---|---|---|---|
| 11,717,956 B1* | 8/2023 | Smith | B25J 19/063 |
| | | | 74/490.05 |
| 11,826,907 B1* | 11/2023 | Smith | B25J 9/0006 |
| 2004/0099783 A1* | 5/2004 | Kienholz | H02K 41/0356 |
| | | | 248/550 |
| 2013/0192406 A1* | 8/2013 | Godowski | B25J 9/106 |
| | | | 901/1 |

* cited by examiner

BIDIRECTIONAL ENERGY STORAGE DEVICE, ROBOTIC JOINT AND ROBOT

CROSS REFERENCE TO RELATED APPLICATIONS

The present application is a continuation-application of International Application PCT/CN2021/127151, with an international filing date of Oct. 28, 2021, which claims foreign priority to Chinese Patent Application No. 202110996910.X, filed on Aug. 27, 2021 in the China National Intellectual Property Administration, the contents of all of which are hereby incorporated by reference in its entirety.

TECHNICAL FIELD

The present disclosure generally relates to robots, and in particular relates to a bidirectional energy storage device, robotic joint, and robot.

BACKGROUND

In the field of robotics, an elastic actuator serves as an auxiliary drive unit positioned between a robotic joint and a load. It is capable of storing a portion of the energy output by the joint and releasing it at an appropriate time.

Some conventional elastic actuators are often limited to unidirectional energy storage and release. This means that during operation, they can only store energy when the joint rotates in a single direction and release energy when the joint rotates in the opposite direction. As a result, such elastic actuators can only provide positive work or negative work for the energy output end of the joint. However, in certain operating conditions, such as complex scenarios involving robotic joints, there is a high demand for both positive and negative work outputs from the joint. For instance, when a joint rotates away from a certain initial position, it may need to do a significant amount of positive work (or negative work), and when it rotates in the opposite direction, it might need to do a significant amount of negative work (or positive work). This requires the elastic actuator to be able to output large positive and negative work at the same time. However, some conventional elastic actuators, which can only output unidirectional work, fail to be effective in these scenarios.

BRIEF DESCRIPTION OF DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, all the views are schematic, and like reference numerals designate corresponding parts throughout the several views.

DETAILED DESCRIPTION

The disclosure is illustrated by way of example and not by way of limitation in the figures of the accompanying drawings, in which like reference numerals indicate similar elements. It should be noted that references to "an" or "one" embodiment in this disclosure are not necessarily to the same embodiment, and such references can mean "at least one" embodiment.

Although the features and elements of the present disclosure are described as embodiments in particular combinations, each feature or element can be used alone or in other various combinations within the principles of the present disclosure to the full extent indicated by the broad general meaning of the terms in which the appended claims are expressed.

Figure 1:
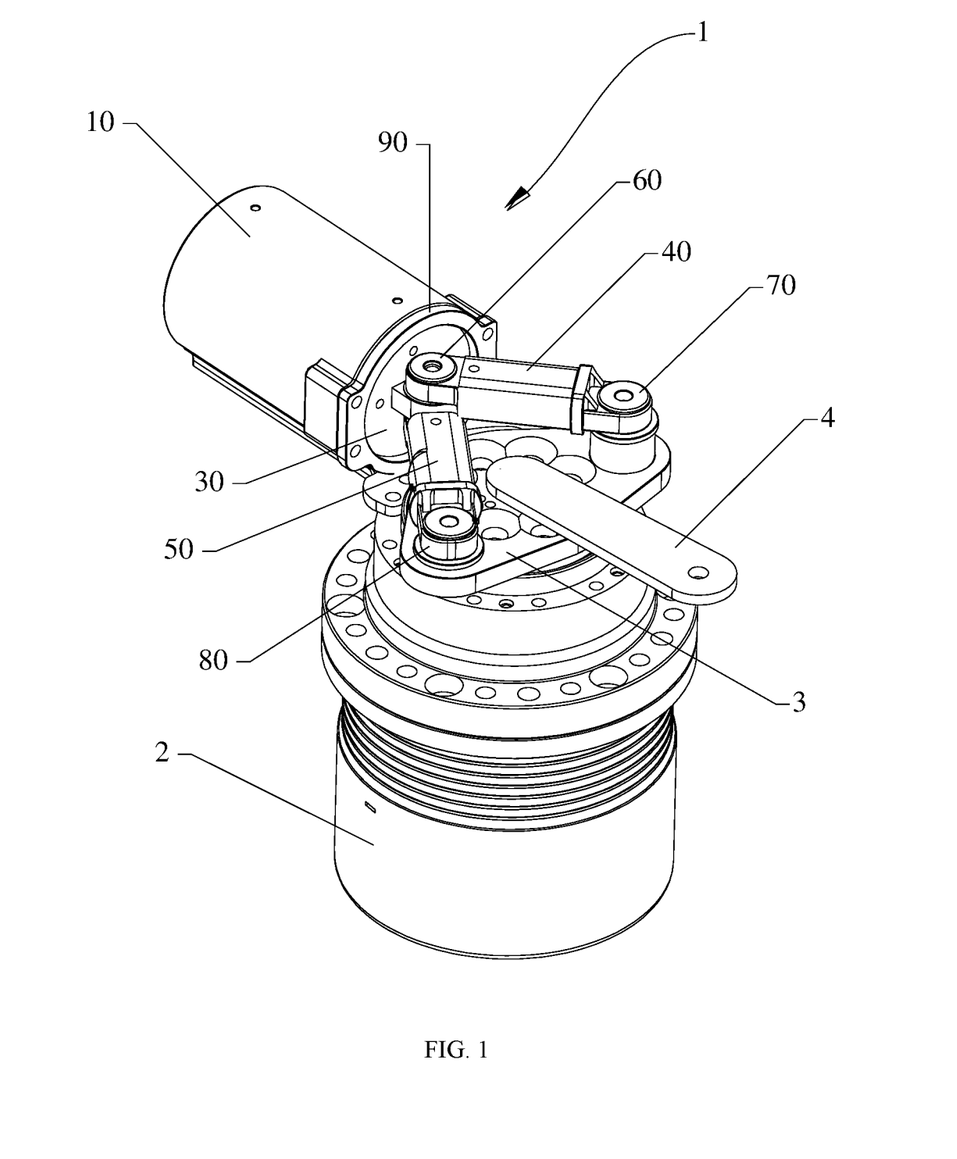
FIG. 1 is a schematic isometric view of a robotic joint including includes a bidirectional energy storage device according to one embodiment.
Figure 2:
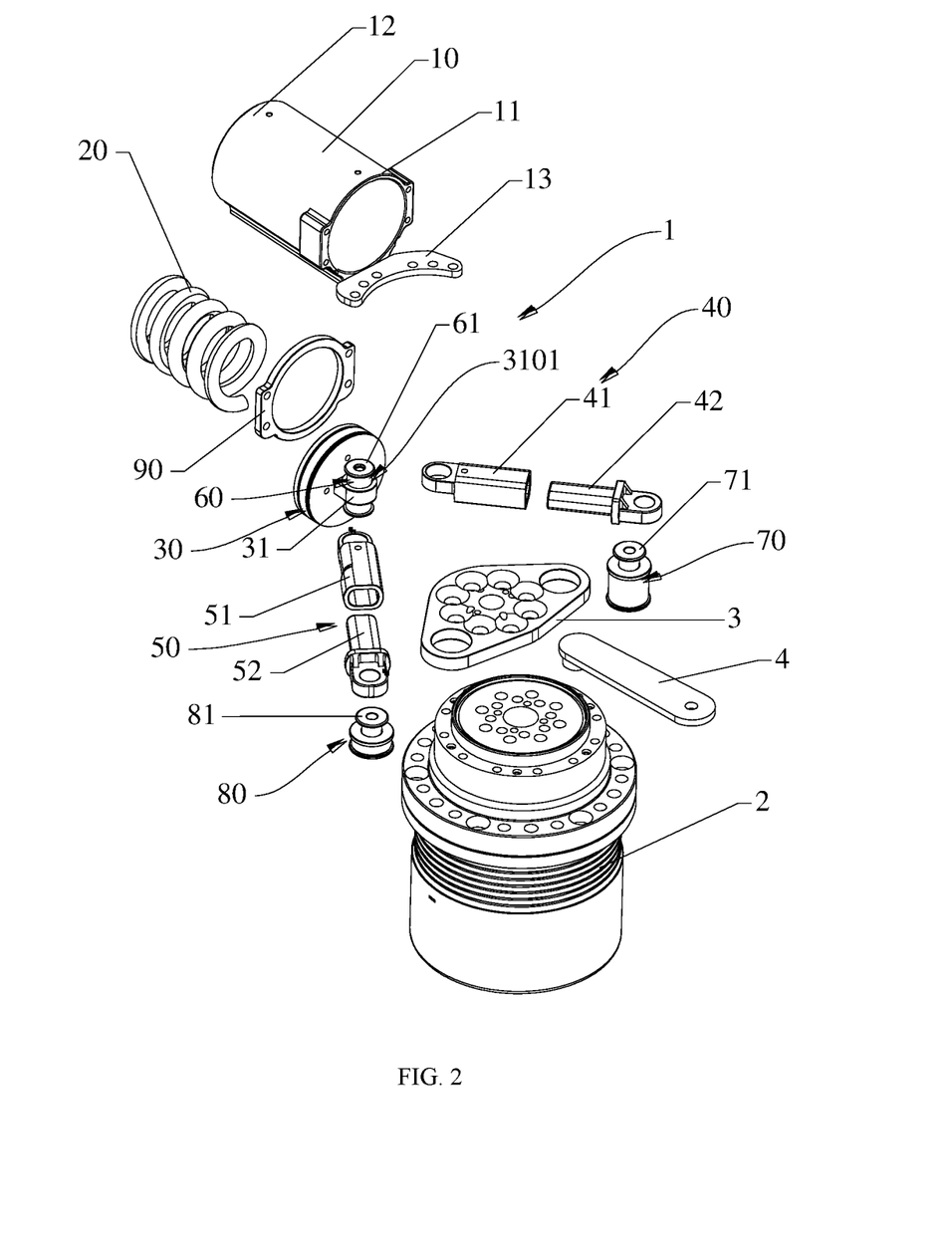
FIG. 2 is an exploded view of the robotic joint according to one embodiment.

FIGS. 1 and 2 show a bidirectional energy storage device 1 for a joint of a robot according to one embodiment. The bidirectional energy storage device 1 is arranged between the joint and the load to assist the joint to drive the load to perform work. The bidirectional energy storage device 1 may include a sleeve 10, an elastic member 20, a sliding member 30, a first telescopic link 40, and a second telescopic link 50.

One end of the sleeve 10 is an open end 11 and the other end of the sleeve 10 is closed end 12. The sleeve 10 defines a receiving chamber. The receiving chamber is an open-ended chamber. A fixing member 13 is fixed to the open end 11 of the sleeve 10, and the fixing part 13 is fixed to the end of the robotic joint. In one embodiment, the fixing member 13 is a substantially arc-shaped fixing plate. In an alternative embodiment, the fixing member 13 may be of other shapes or other structures. The elastic member 20 is arranged in the receiving chamber in the sleeve 10, and one end of the elastic member 20 is in contact with the inner surface of the closed end 12 of the sleeve 10. The sliding member 30 is slidably disposed at the open end 11 of the sleeve 10, and the other end of the elastic member 20 is in contact with the sliding member 30. That is, the opposite ends of the elastic member 20 respectively abut against the inner surface of the closed end 12 and the sliding member 30.

One end of the first telescopic link 40 is pivotally connected to the sliding member 30, and one end of the second telescopic link 50 is also pivotally connected to the sliding member 30. The other ends of the first telescopic link 40 and the second telescopic link 50 are respectively pivotally connected to two separated connecting ends of a rotating member 3 at one end of the robotic joint of the robot. That is, opposite ends of the first telescopic link 40 and the second telescopic link 50 are respectively pivotally connected to the sliding member 30 and the rotating member 3 at the end of the robotic joint. Therefore, when the rotating member 3 at the end of the robotic joint rotates clockwise or counter-clockwise, the first telescopic link 40 retracts and/or the second telescopic link 50 extends to drive the sliding member 30 to slide along the sleeve 10. When the rotating member 3 at the end of the robotic joint rotates counter-clockwise or clockwise, the first telescopic link 40 extends and/or the second telescopic link 50 retracts to drive the sliding member 30 to slide along the sleeve 10.

Figure 3:
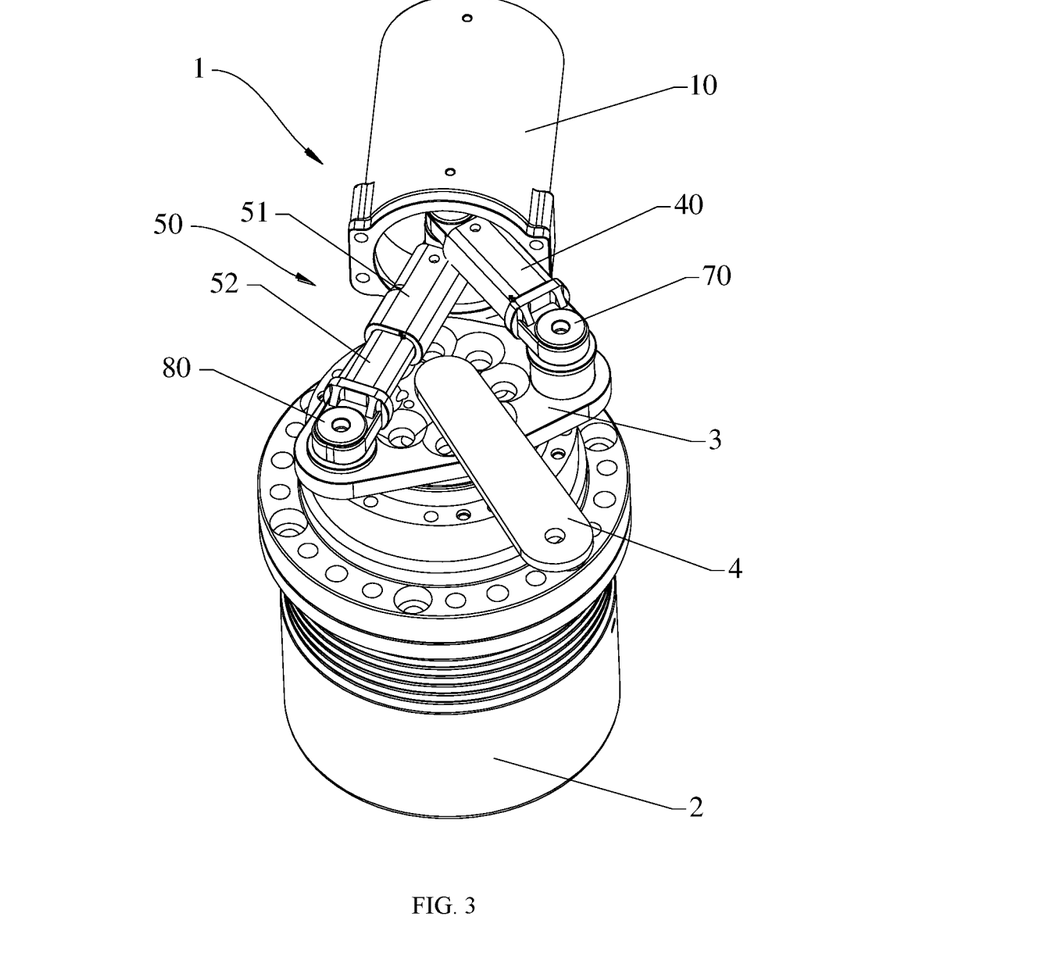
FIG. 3 is a schematic isometric view of the robotic joint in a state of rotating to one side.
Figure 4:
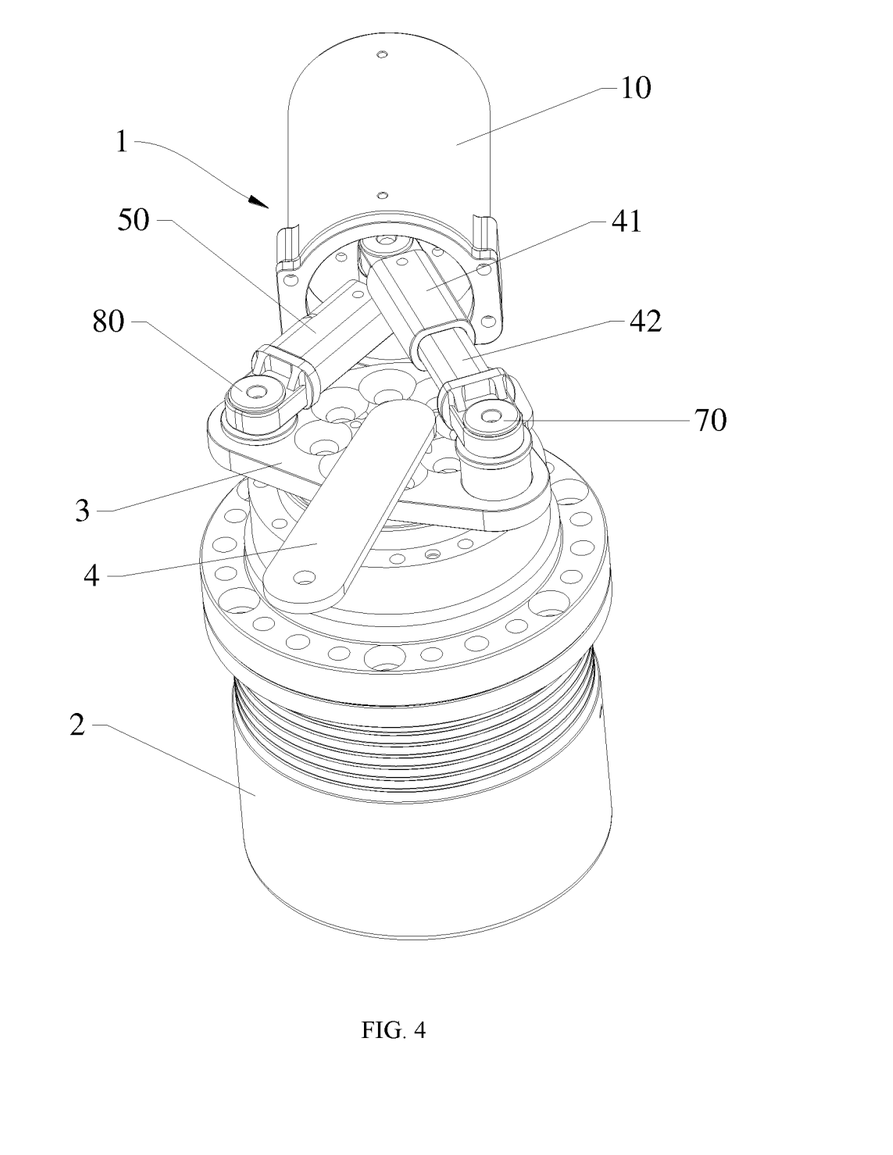
FIG. 4 is another schematic isometric view of the robotic joint in a state of rotating to the other side.

Specifically, as shown in FIG. 1, the bidirectional energy storage device 1 is mounted on the end of the robotic joint. The robotic joint may include a main body 2 and a rotating member 3 connected to the rotating output end of the main body 2. The rotating member 3 is rotatably mounted at the end of the rotating output end of the main body 2 and is driven to rotate by the rotating output end of the main body 2. The rotating member 3 is connected to a load connecting member 4, and the load connecting member 4 drives an external load to move through the rotating member 3. The fixing member 13 of the sleeve 10 is fixed to the end of the main body 2 through fasteners. The arc-shaped fixing member 13 matches the shape of the end of the joint body 2, which is beneficial to their fitting and fixation. The state shown in FIG. 1 of the bidirectional energy storage device 1 is referred to as the initial state (also referred to as the zero-point state). When the rotating member 3 at the end of the main body 2 rotates to one side relative to the initial state, for example, when rotating counterclockwise as shown in FIG. 3, the rotating member 3 drives the first telescopic link 40 and the second telescopic link 50 to rotate. During their rotation, the second telescopic link 50 extends, and the length of the first telescopic link 40 remains unchanged or shortens. The first telescopic link 40 pushes the sliding member 30 to slide along the sleeve 10 from the open end 11 toward the closed end 12. The sliding member 30 gradually approaches the closed end 12, and the elastic member 20 located between the sliding member 30 and the closed end 12 undergoes compressive elastic deformation, thereby storing elastic energy. During this process, the bidirectional energy storage device 1 does positive work (or negative work) on the robotic joint. When the rotating member 3 at the end of the main body 2 rotates to the other side relative to the initial state, for example, when rotating clockwise as shown in FIG. 4, the rotating member 3 drives the first telescopic link 40 and the second telescopic link 50 to rotate. During their rotation, the first telescopic link 40 extends, and the length of the second telescopic link 50 remains unchanged or shortens. The second telescopic link 50 pushes the sliding member 30 to slide along the sleeve 10 from the open end 11 toward the closed end 12. The sliding member 30 gradually approaches the closed end 12, and the elastic member 20 located between the sliding member 30 and the closed end 12 undergoes compressive elastic deformation, thereby storing elastic energy. During this process, the bidirectional energy storage device 1 does negative work (or positive work) on the robotic joint. It can be seen from this that no matter which direction the rotating member 3 rotates, the rotating member 3 can drive the first telescopic link 40 and/or the second telescopic link 50 to extend/retract. As a result, the first telescopic link 40 or the second telescopic link 50 can push the sliding member 30 to slide, thereby causing the elastic member 20 to compress and deform, thereby realizing energy storage during the bidirectional rotation of the rotating member 3.

On the contrary, on the basis of the state shown in FIG. 3, if the rotating member 3 rotates clockwise and returns to the initial state, the elastic member 20 gradually recovers its deformation from the previous compression state, and gradually releases the elastic potential energy stored in the compression state. The elastic member 20 will push the sliding member 30 to slide in a direction gradually away from the closed end 12 and closer to the open end 11. The rotating member 3 drives the first telescopic link 40 and the second telescopic link 50 to rotate clockwise. The length of the second telescopic link 50 gradually shortens, and as the clockwise rotation angle of the rotating member 3 increases, the length of the first telescopic link 40 remains unchanged or gradually increases. Preferably, when the rotating member 3 rotates clockwise from the state shown in FIG. 3 to the initial position shown in FIG. 1, the second telescopic link 50 returns to its original length, and the length of the first telescopic link 40 remains unchanged or returns to its original length. At this time, the elastic member 20 returns to its original length, and the elastic member 20 releases energy. After rotating to the initial position as shown in FIG. 1, if the rotating member 3 continues to rotate clockwise, referring to the state of storing energy as shown in FIG. 4. That is, the rotating member 3 drives the first telescopic link 40 and the second telescopic link 50 to rotate. During their rotation, the first telescopic link 40 extends, and the length of the second telescopic link 50 remains unchanged or shortens. The second telescopic link 50 pushes the sliding member 30 to slide along the sleeve 10 from the open end 11 toward the closed end 12. The sliding member 30 gradually approaches the closed end 12, and the elastic member 20 located between the sliding member 30 and the closed end 12 undergoes compressive elastic deformation, thereby storing elastic energy.

Similarly, based on the state shown in FIG. 4, during the process of the rotating member 3 rotating counterclockwise and returning to the initial state, the elastic member 20 gradually recovers its deformation from the previous compression state, and gradually releases the elastic potential energy stored in the compression state. The elastic member 20 will push the sliding member 30 to slide in a direction gradually away from the closed end 12 and closer to the open end 11. The rotating member 3 drives the first telescopic link 40 and the second telescopic link 50 to rotate clockwise. The first telescopic link 40 gradually shortens, and as the counterclockwise rotation angle of the rotating member 3 increases, the length of the second telescopic link 50 remains unchanged or gradually increases. Preferably, when the rotating member 3 rotates counterclockwise from the state shown in FIG. 4 to the initial position shown in FIG. 1, the first telescopic link 40 returns to its original length, and the second telescopic link 50 remains unchanged or returns to its original length. At this time, the elastic member 20 also returns to its original length, and the elastic members 20 releases energy. After rotating to the initial position as shown in FIG. 1, if the rotating member 3 continues to rotate counterclockwise, referring to the energy storage state shown in FIG. 3. That is, the rotating member 3 drives the first telescopic link 40 and the second telescopic link 50 to rotate. During their rotation, the second telescopic link 50 extends, and the length of the first telescopic link 40 remains unchanged or shortens. The first telescopic link 40 pushes the sliding member 30 to slide along the sleeve 10 from the open end 11 to the closed end 12, and the sliding member 30 gradually approaches the closed end 12. The elastic member 20 located between the sliding member 30 and the closed end 12 undergoes compressive elastic deformation, thereby storing elastic energy.

Compared with some conventional elastic actuators, the bidirectional joint energy storage device 1 is provided with an elastic member 20 between the sleeve 10 and the sliding member 30. One end of each of the first telescopic link 40 and the second telescopic link 50 is pivotally connected to the sliding member 30. The other ends of the first telescopic link 40 and the second telescopic link 50 are pivotally connected to the rotating member 3 at the end of the robotic joint. The rotating member 3 can be connected to the load connecting member 4 to drive the load to perform work. When the joint rotates to both sides respectively, the rotating member 3 at the end drives the load to perform work. The rotating member 3 drives the first telescopic link 40 and/or the second telescopic link 50 to extend and retract, thereby realizing bidirectional storage and bidirectional release of energy. Specifically, when the rotating member 3 rotates to one side, it drives the first telescopic link 40 to retract and/or the second telescopic link 50 to extend, so as to drive the sliding member 30 to slide along the sleeve 10. When the rotating member 3 rotates to the other side, it drives the first telescopic link 40 to extend and/or the second telescopic link 50 to retract, so as to drive the sliding member 30 to slide along the sleeve 10. The sliding of the sliding member 30 causes the elastic member 20 located between the inner surface of the closed end 12 of the sleeve 10 and the sliding member 30 to deform, thereby realizing bidirectional energy storage. When the bidirectional energy storage device 1 is in the energy storage state, if the rotating member 3 rotates in the reverse direction, the elastic member 20 drives the sliding member 30 to slide in the reverse direction. The sliding member 30 further drives the first telescopic link 40 and/or the second telescopic link 50 to extend and retract until the first telescopic link 40 and the second telescopic link 50 return to their initial length, and the elastic member 20 returns to the initial state. In this process, the telescopic motion of the first telescopic link 40 and the second telescopic link 50 can assist the rotational motion of the rotating member, thereby assisting the rotating member in performing work on the load, thereby realizing a bidirectional release of the energy of the elastic member 20. This can simultaneously satisfy the requirements of outputting larger positive work (or negative work) during forward rotation and outputting larger negative work (or positive work) during reverse rotation, achieving bidirectional energy storage and bidirectional work.

In one embodiment, as shown in FIG. 2, the elastic member 20 is a compression spring. The opposite ends of the compression spring respectively abut the inner surface of the closed end 12 of the sleeve 10 and the sliding member 30. When the first telescopic link 40 or the second telescopic link 50 pushes the sliding member 30 to slide from the open end 11 toward the closed end 12, the compression spring is compressed and stores energy. On the contrary, when the first telescopic link 40 or the second telescopic link 50 is shortened and restored, the compression spring pushes the sliding member 30 to slide in the reverse direction under its own elastic force, so that the sliding member 30 assists in pushing the first telescopic link 40 or the second telescopic link 50 to retract. This further assists the rotation of the rotating member 3 and releases energy. By using a spring as the elastic member 20 for storing and releasing energy, the structure is simple, easy to manufacture and easy to assemble.

In another embodiment, the elastic element 20 may be a magnetic spring including a number of magnets slidably assembled in the sleeve 10 along the axial direction of the sleeve 10. The magnetic poles on the opposite sides of each two adjacent magnets are opposite, so that each two adjacent magnets repel each other. When the first telescopic link 40 or the second telescopic link 50 pushes the sliding member 30 to slide from the open end 11 toward the closed end 12, the spacing between the magnets of the magnetic spring is compressed and reduced, thereby storing energy. On the contrary, when the length of the first telescopic link 40 or the second telescopic link 50 is shortened and restored, since each two adjacent magnets of the magnetic spring repel each other, the magnets move away from each other under the action of magnetic force, and the distance between each two adjacent magnets increases. As a result, the magnetic spring pushes the sliding member 30 to slide in the reverse direction, so that the sliding member 30 assists in pushing the first telescopic link 40 or the second telescopic link 50 to retract, thereby further assisting the rotation of the rotating member 3 and releasing energy. By using a magnetic spring as the elastic member 20, the structure is simple and easy to assemble. The magnetic force can be used to store and release energy. The magnetic spring will not be easily over-deformed and cause structural damage like conventional springs during use, and has a longer service life.

In another embodiment, the elastic element 20 may be a leaf spring. The opposite ends of the leaf spring respectively abut the inner surface of the closed end 12 of the sleeve 10 and the sliding member 30. When the first telescopic link 40 or the second telescopic link 50 pushes the sliding member 30 to slide from the open end 11 toward the closed end 12, the opposite ends of the leaf spring are forced to bend and deform, thereby realizing bidirectional energy storage. On the contrary, when the first telescopic link 40 or the second telescopic link 50 is shortened and restored, the leaf spring has a tendency to recover its shape and pushes the sliding member 30 to slide in the reverse direction, so that the sliding member 30 assists in pushing the first telescopic link 40 or the second telescopic link 50 to retract. This further assists the rotation of the rotating member 3 until the shape of the leaf spring is restored, thereby realizing the release of energy. By using a leaf spring as the elastic member 20 for storing and releasing energy, the structure is simple, easy to manufacture and easy to assemble. In other embodiments, the elastic member 20 may be implemented using other components capable of storing and releasing energy.

In one embodiment, as shown in FIG. 2, the sliding member 30 is a sliding plate received in the sleeve 10. The sliding plate can be a round plate, and the cross-section of the sliding plate matches the cross-sectional shape of the sleeve 10. The sliding plate is slidably arranged at the open end 11 of the sleeve 10, so that the sliding plate can slide axially along the sleeve 10 within the sleeve 10 under the action of force. One end of the elastic member 20 contacts one side of the sliding plate, so that the elastic member 20 and the sliding plate can push against each other, and the round sliding plate can facilitate stable force transmission.

In one embodiment, as shown in FIG. 2, the side of the sliding member 30 facing the outside of the sleeve 10 has a protruding mounting member 31, and the mounting member 31 defines a mounting hole 3101. The bidirectional energy storage device 1 includes a first rotating shaft 60. The first rotating shaft 60 is cylindrical. The first rotating shaft 60 passes through the mounting hole 3101. Each end of the first telescopic link 40 and the second telescopic link 50 is provided with a through hole and is respectively arranged around the first rotating shaft 60. The first telescopic link 40 and the second telescopic link 50 are thus rotatably connected to the first rotating shaft 60. With such configuration, the first telescopic link 40 and the second telescopic link 50 are pivotally connected to the same rotating shaft provided on the sliding member 30, thereby realizing the pivotal connection between the first telescopic link 40 and the sliding member 30 and between the second telescopic link 50 and the sliding member 30. Therefore, both the first telescopic link 40 and the second telescopic link 50 can rotate around the first rotating shaft 60.

The end of the first rotating shaft 60 is provided with two limiting flanges 61 for preventing the first telescopic link 40 and/or the second telescopic link 50 from disengaging from the first rotating shaft 60. Specifically, in the illustrated embodiment, limiting flanges 61 are provided at opposite ends of the first rotating shaft 60, and the middle portion of the first rotating shaft 60 is received in the mounting hole 3101 of the mounting member 31. The limiting flanges 61 at opposite ends of the first rotating shaft 60 are respectively located at opposite sides of the mounting member 31. One end of the first telescopic link 40 is arranged around the outer lateral surface of the first rotating shaft 60 through a through hole in the end. The end of the first telescopic link 40 is limited between the mounting member 31 and the limiting flange 61 at one end of the first rotating shaft 60.

One end of the second telescopic link 50 is arranged around the outer lateral surface of the first rotating shaft 60 through a through hole in the end. The end of the second telescopic link 50 is limited between the mounting member 31 and the limiting flange 61 at the other end of the first rotating shaft 60. In this way, the respective ends of the first telescopic link 40 and the second telescopic link 50 are respectively located on opposite ends of the mounting member 31 and are limited by the limiting flanges 61. The limiting flanges 61 can prevent the first telescopic link 40 and the second telescopic link 50 from disengaging from the first rotating shaft 60.

In one embodiment, as shown in FIGS. 2 to 4, the bidirectional energy storage device 1 further includes a second rotating shaft 70 and a third rotating shaft 80. One end of the second rotating shaft 70 includes a limiting flange 71, and the other end of the second rotating shaft 70 is fixed to the rotating member 3 at the end of the robotic joint. One end of the third rotating shaft 80 includes a limiting flange 81, and the other end of the third rotating shaft 80 is fixed to the rotating member 3 at the end of the robotic joint. The other ends of the first telescopic link 40 and the second telescopic link 50 are provided with through holes. The first telescopic link 40 is rotatably arranged around the second rotating shaft 70 through the through hole at its end. The first telescopic link 40 is limited by the limiting flange 71 to prevent the first telescopic link 40 from disengaging from the second rotating shaft 70. Similarly, the second telescopic link 50 is rotatably arranged around the third rotating shaft 80 through the through hole at its end. The second telescopic link 50 is limited by the limiting flange 81 to prevent the second telescopic link 50 from disengaging from the third rotating shaft 80. The second rotating shaft 70 and the third rotating shaft 80 are respectively fixed at different positions of the rotating member 3. This allows the first telescopic link 40 to rotate around the second rotating shaft 70 relative to the rotating member 3, and the second telescopic link 50 to rotate around the third rotating shaft 80 relative to the rotating member 3. An angle is formed between the first telescopic link 40 and the second telescopic link 50. In this way, the first telescopic link 40 is rotatably connected to the rotating member 3 at the end of the joint through the second rotating shaft 70, and the second telescopic link 50 is rotatably connected to the rotating member 3 at the end of the joint through the third rotating shaft 80. When the rotating member 3 rotates, the rotating member 3 drives the first telescopic link 40 and the second telescopic link 50 to rotate. During their rotation, the first telescopic link 40 and/or the second telescopic link 50 can extend and retract.

The heights of the second rotating shaft 70 and the third rotating shaft 80 are different. In this way, the ends of the first telescopic link 40 and the second telescopic link 50 are located at positions of different heights. As a result, there will be no interference between the first telescopic link 40 and the second telescopic link 50. In other embodiments, the heights of the second rotating shaft 70 and the third rotating shaft 80 may be the same, as long as the positions at which the first telescopic link 40 is arranged around the second rotating shaft 70 and the second telescopic link 50 is arranged around the third rotating shaft 80 are at different heights.

Referring to FIGS. 1 and 2, in one embodiment, the bidirectional energy storage device 1 includes a stopping member 90. The stopping member 90 is fixed to the open end 11 of the sleeve 10 to prevent the sliding member 30 from disengaging from the sleeve 10.

In the illustrated embodiment, the stopping member 90 is an annular retaining ring, and the annular retaining ring is in contact with and fixed to the open end 11 of the sleeve 10. The cross-sectional size of the sliding member 30 is larger than the size of the hole of the annular retaining ring, so that the sliding member 30 cannot pass through the annular retaining ring, thereby preventing the sliding member 30 from sliding out of the open end 11.

Referring to FIG. 2, in one embodiment, the first telescopic link 40 includes a tubular member 41 and a rod 42. The tubular member 41 defines a receiving chamber therein. One end of the tubular member 41 is open and the other end is closed, so that the opposite ends of the tubular member 41 are an end surface and a groove surface. The end surface of the tubular member 41 is provided with a through hole and is rotatably arrange around the first rotating shaft 60. One end of the rod 42 is an axial surface and is provided with a through hole. The axial surface of the rod 42 is rotatably arranged around the second rotation shaft 70. The other end of the rod 42 is an abutting surface and extends into the receiving chamber of the tubular member 41 to slide along the tubular member 41 to realize the extension and retraction of the first telescopic link 40.

Similarly, the second telescopic link 50 includes a tubular member 51 and a rod 52. The tubular member 51 defines a receiving chamber therein. One end of the tubular member 51 is open and the other end is closed. In this way, the opposite ends of the tubular member 51 are an end surface and a groove surface respectively. The end surface of the tubular member 51 is provided with a through hole and is rotatably arrange around the first rotating shaft 60. One end of the rod 52 is an axial surface and is provided with a through hole. The axial surface of the rod 52 is rotatably arranged around the third rotation shaft 80. The other end of the rod 52 is an abutting surface and extends into the receiving chamber of the tubular member 51 to slide along the tubular member 51 to realize the extension and retraction of the second telescopic link 50.

Specifically, in the initial state (also referred to as the zero-point state) shown in FIG. 1, the abutting surface of the rod 42 abuts against the end surface of the tubular member 41, and the abutting surface of the rod 52 abuts against the end surface of the tubular member 51. When the first telescopic link 40 and the second telescopic link 50 rotate to one side relative to the initial state, for example, when rotating counterclockwise, as shown in FIG. 3, the abutting surface of the rod 42 and the end surface of the tubular member 41 are in contact with each other, and the abutting surface of the rod 52 and the end face of the tubular member 51 gradually move away from each other. The abutting surface of the rod 52 slides in the tubular member 51, thereby realizing the extension of the second telescopic link 50. When the first telescopic link 40 and the second telescopic link 50 rotate in the opposite direction and return to the initial state, the abutting surface of the rod 42 and the end surface of the tubular member 41 are still in contact with each other, and the abutting surface of the rod 52 and the end surface of the tubular member 51 gradually approach each other until they come into contact with each other. The abutting surface of the rod 52 slides in the tubular member 51, thereby realizing the retraction of the second telescopic link 50.

When the first telescopic link 40 and the second telescopic link 50 rotate to the other side relative to the initial state, for example, when rotating clockwise, as shown in FIG. 4, the abutting surface of the rod 52 is in contact with the end surface of the tubular member 51, and the abutting surface of the rod 42 is disengaged from the end surface of the tubular member 41. The abutting surface of the rod 42 slides in the tubular member 41, thereby realizing the extension of the first telescopic link 40. When the first telescopic link 40 and the second telescopic link 50 rotate in the opposite direction and return to the initial state, the abutting surface of the rod 52 and the end surface of the tubular member 51 are still in contact with each other, and the abutting surface of the rod 42 and the end surface of the tubular member 41 gradually approach each other until they come into contact with each other. The abutting surface of the rod 42 slides in the tubular member 41, thereby realizing the retraction of the first telescopic link 40.

In other embodiments, the first telescopic link 40 and the second telescopic link 50 may adopt other reasonable telescopic structures according to actual needs. For example, the first telescopic link 40 may include two rods, one of which is provided with a slide groove, and the other one of which is provided with a slide block and is slidably received in the slide groove. As a result, the two rods can slide relative to each other, forming a telescopic structure that can extend and retract. The structure of the second telescopic link 50 can be the same as that of the first telescopic link 40.

In other embodiments, for the first telescopic link 40, the positions of the tubular member 41 and the rod 42 can be interchanged. That is, the rod 42 is rotatably connected to the first rotating shaft 60, and the tubular member 41 is rotatably connected to the second rotating shaft 70. Similarly, for the second telescopic link 50, the positions of the tubular member 51 and the rod 52 can be interchanged. That is, the rod 52 is rotatably connected to the first rotating shaft 60, and the tubular member 51 is rotatably connected to the third rotating shaft 80.

Referring to FIGS. 1 to 4, in one embodiment, the lengths of the first telescopic link 40 and the second telescopic link 50 are the same. In this way, the maximum angle of rotation of the first telescopic link 40 driven by the rotating member 3 is the same as the maximum angle of rotation of the first telescopic link 40 driven by the rotating member 3. The maximum angles of rotation of the rotating member 3 to opposite sides are the same.

In another embodiment, the lengths of the first telescopic link 40 and the second telescopic link 50 are different, so that the maximum angles of rotation of the rotating member 3 to opposite sides are different. According to the actual needs, when the requirements for the amount of work done by the robotic joint when they rotate to opposite sides are different, the lengths of the first telescopic link 40 and the second telescopic link 50 may be set to be different, enabling the bidirectional energy storage device 1 to store and release different amounts of energy in the two directions.

By changing the lengths of the tubular member 41 of the first telescopic link 40 and the tubular member 51 of the second telescopic link 50, the lengths of the first telescopic link 40 and the second telescopic link 50 can be different. The positions of the first telescopic link 40 and the second telescopic link 50 in the initial state of the bidirectional energy storage device 1 can be different.

Referring to FIG. 1, the present disclosure further provides a robotic joint, which includes the above-mentioned bidirectional energy storage device 1, the main body 2, and the rotating member 3. The rotating member 3 is rotatably mounted at one end of the main body 2. The rotating member 3 is connected to the load connecting member 4 that is connected to the load. The main body 2 is provided with an actuating device. For example, the actuating device can be a motor. The actuating device drives the rotating member 3 to rotate. The rotating member 3 drives the load to perform work through the load connecting member 4. The first telescopic link 40 and the second telescopic link 50 of the bidirectional energy storage device 1 are respectively pivotally connected to different positions of the rotating member 3. The rotating member 3 drives the first telescopic link 40 and the second telescopic link 50 to rotate. During their rotation, the first telescopic link 40 and/or the second telescopic link 50 perform telescopic movement. The robotic joint can be various rotational joints, such as knee joints, elbow joints, wrist joints, etc.

Since the robotic joint incorporates all the technical solutions from the aforementioned implementations, it likewise benefits from all the advantageous effects brought about by these implementations, which will not be repeated here.

The present disclosure further provides a robot, which includes the above-mentioned bidirectional energy storage device 1. Since the robot incorporates all the technical solutions from the aforementioned implementations, it likewise benefits from all the advantageous effects brought about by these implementations, which will not be repeated here.

The bidirectional energy storage device 1 and the robotic joint and robot including the bidirectional energy storage device 1 have the following advantages: 1) The elastic member 20 can store and release energy in specific intervals of the robotic joint, thereby enhancing the joint's burst capability at crucial moments; 2) The bidirectional energy storage device 1 utilizes the clutch conversion of a linkage mechanism to realize bidirectional energy storage and release in the robotic joint. This addresses the limitation of some conventional elastic actuators, which only support unidirectional energy storage and opposite direction release. The bidirectional energy storage device 1 can assist the robotic joint to perform positive and negative work on the load, and can meet the load's demand for positive and negative work under complex working conditions; 3) The bidirectional energy storage device 1 assists the main body 2 in performing work on the load, reducing the power demand on the joint, improving the output performance of the robot through a mechanical structure, and achieving cost reduction and energy saving; 4) The bidirectional energy storage device 1 is of modular design and can be directly mounted between the robotic joint and the load. This flexibility means it can be installed as needed and removed when not required, facilitating customization and adaptation to various applications without extensive modifications; 5) The bidirectional energy storage device 1 can be applied to any type of rotating joint and has strong applicability.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:
1. A bidirectional energy storage device for a joint, comprising:
    a sleeve comprising an open end and an opposite, closed end;
    an elastic member attached to the sleeve;

a sliding member slidably arranged at the open end of the sleeve, wherein opposite ends of the elastic member are respectively in contact with the closed end of the sleeve and the sliding member;

a first telescopic link comprising a first end pivotally connected to the sliding member and an opposite, second end; and a second telescopic link comprising a first end pivotally connected to the sliding member and an opposite, second end;

wherein the second ends of the first telescopic link and the second telescopic link are pivotally connected to a rotating member at an end of the joint, the first telescopic link and the second telescopic link are configured to extend and retract to drive the sliding member to side along the sleeve when the rotating member rotates.

2. The bidirectional energy storage device of claim 1, wherein the elastic member is a compression spring, a magnetic spring, or a leaf spring, the magnetic spring comprises a plurality of magnets slidably received in the sleeve along an axial direction of the sleeve, and each two adjacent ones of the magnets repel each other.

3. The bidirectional energy storage device of claim 1, wherein the sliding member is a sliding plate received in the sleeve.

4. The bidirectional energy storage device of claim 3, further comprising a first rotating shaft, wherein the sliding member comprises a mounting member that defines a mounting hole, the first rotating shaft pass through the mounting hole, and the first telescopic link and the second telescopic link are rotatably connected to the first rotating shaft.

5. The bidirectional energy storage device of claim 1, further comprising a stopping member that is fixed to the open end of the sleeve to prevent the sliding member from disengaging from the sleeve.

6. The bidirectional energy storage device of claim 5, wherein the stopping member is a ring in contact with and fixed to the open end of the sleeve.

7. The bidirectional energy storage device of claim 1, wherein the first telescopic link and the second telescopic link each comprise a tubular member and a rod, the rod extends into the tubular member and is slidable along the tubular member.

8. A robotic joint comprising:
a main body;
a rotating member rotatably connected to the main body; and
a bidirectional energy storage device comprising:
a sleeve comprising an open end and an opposite, closed end;
an elastic member attached to the sleeve;
a sliding member slidably arranged at the open end of the sleeve, wherein opposite ends of the elastic member are respectively in contact with the closed end of the sleeve and the sliding member;
a first telescopic link comprising a first end pivotally connected to the sliding member and an opposite, second end; and
a second telescopic link comprising a first end pivotally connected to the sliding member and an opposite, second end;
wherein the second ends of the first telescopic link and the second telescopic link are pivotally connected to the rotating member, the first telescopic link and the second telescopic link are configured to extend and retract to drive the sliding member to side along the sleeve when the rotating member rotates.

9. The robotic joint of claim 8, wherein the elastic member is a compression spring, a magnetic spring, or a leaf spring, the magnetic spring comprises a plurality of magnets slidably received in the sleeve along an axial direction of the sleeve, and each two adjacent ones of the magnets repel each other.

10. The robotic joint of claim 8, wherein the sliding member is a sliding plate received in the sleeve.

11. The bidirectional energy storage device of claim 10, wherein the bidirectional energy storage device further comprises a first rotating shaft, the sliding member comprises a mounting member that defines a mounting hole, the first rotating shaft pass through the mounting hole, and the first telescopic link and the second telescopic link are rotatably connected to the first rotating shaft.

12. The robotic joint of claim 8, wherein the bidirectional energy storage device further comprises a stopping member that is fixed to the open end of the sleeve to prevent the sliding member from disengaging from the sleeve.

13. The robotic joint of claim 12, wherein the stopping member is a ring in contact with and fixed to the open end of the sleeve.

14. The robotic joint of claim 8, wherein the first telescopic link and the second telescopic link each comprise a tubular member and a rod, the rod extends into the tubular member and is slidable along the tubular member.

15. A robot comprising:
a bidirectional energy storage device for a joint, comprising:
a sleeve comprising an open end and an opposite, closed end;
an elastic member attached to the sleeve;
a sliding member slidably arranged at the open end of the sleeve, wherein opposite ends of the elastic member are respectively in contact with the closed end of the sleeve and the sliding member;
a first telescopic link comprising a first end pivotally connected to the sliding member and an opposite, second end; and
a second telescopic link comprising a first end pivotally connected to the sliding member and an opposite, second end;
wherein the second ends of the first telescopic link and the second telescopic link are pivotally connected to a rotating member at an end of the joint, the first telescopic link and the second telescopic link are configured to extend and retract to drive the sliding member to side along the sleeve when the rotating member rotates.

16. The robot of claim 15, wherein the elastic member is a compression spring, a magnetic spring, or a leaf spring, the magnetic spring comprises a plurality of magnets slidably received in the sleeve along an axial direction of the sleeve, and each two adjacent ones of the magnets repel each other.

17. The robot of claim 15, wherein the sliding member is a sliding plate received in the sleeve.

18. The robot of claim 17, further comprising a first rotating shaft, wherein the sliding member comprises a mounting member that defines a mounting hole, the first rotating shaft pass through the mounting hole, and the first telescopic link and the second telescopic link are rotatably connected to the first rotating shaft.

19. The robot of claim 15, further comprising a stopping member that is fixed to the open end of the sleeve to prevent the sliding member from disengaging from the sleeve.

20. The robot of claim 19, wherein the stopping member is a ring in contact with and fixed to the open end of the sleeve.

\* \* \* \* \*